United States Patent [19]

Bair

[11] 4,303,835
[45] Dec. 1, 1981

[54] WIND POWERED GENERATOR WITH CYCLIC AIRFOIL LATCHING

[76] Inventor: Puran Bair, 49 Elliot St., Jamaica Plain, Mass. 02130

[21] Appl. No.: 135,343

[22] Filed: Mar. 31, 1980

[51] Int. Cl.³ .......................... F01D 7/00; F03D 7/06
[52] U.S. Cl. ...................................... 290/55; 290/44; 416/17; 416/119
[58] Field of Search .................... 290/43, 44, 54, 55; 416/17, 111, 115, 119

[56] References Cited

U.S. PATENT DOCUMENTS

| | | | |
|---|---|---|---|
| 1,075,060 | 10/1913 | O'Toole | 416/142 B |
| 2,178,679 | 11/1939 | Claytor | 290/44 |
| 2,363,827 | 11/1944 | Albers | 290/44 |
| 2,373,207 | 4/1945 | Touhey | 290/44 |
| 2,388,377 | 11/1945 | Albers | 290/55 |
| 2,542,522 | 2/1951 | Hings | 290/55 |
| 2,603,300 | 7/1952 | King | 416/111 |
| 2,667,589 | 1/1954 | Levrero | 290/55 |
| 3,222,533 | 12/1965 | MacKay | 290/55 |
| 3,730,643 | 5/1973 | Davison | 416/17 |
| 3,743,848 | 7/1973 | Strickland | 290/55 |
| 3,793,530 | 2/1974 | Carter | 290/55 |
| 3,874,816 | 4/1975 | Sweeney et al. | 416/139 |
| 3,883,750 | 5/1975 | Uzzell, Jr. | 290/55 |
| 3,895,236 | 7/1975 | Herron | 290/55 |
| 3,902,072 | 8/1975 | Quinn | 290/44 |
| 3,942,026 | 3/1976 | Carter | 290/55 |
| 3,944,839 | 3/1976 | Carter | 290/55 |
| 3,995,170 | 11/1976 | Graybill | 290/55 |
| 4,031,173 | 6/1977 | Rogers | 290/55 |
| 4,039,848 | 8/1977 | Winderl | 290/55 |
| 4,039,849 | 8/1977 | Mater et al. | 290/55 |
| 4,048,947 | 9/1977 | Sicard | 290/55 |
| 4,050,246 | 9/1977 | Bourquardez | 290/55 |
| 4,066,911 | 1/1978 | Sarchet | 290/44 |
| 4,113,408 | 9/1978 | Wurtz et al. | 416/17 |
| 4,115,027 | 9/1978 | Thomas | 290/44 |
| 4,129,787 | 12/1978 | Palma | 290/55 |
| 4,156,580 | 5/1979 | Pohl | 290/55 |
| 4,178,126 | 12/1979 | Weed | 416/17 |

FOREIGN PATENT DOCUMENTS

| | | | |
|---|---|---|---|
| 2807092 | 2/1978 | Fed. Rep. of Germany | 290/55 |
| 2289769 | 4/1974 | France | 416/DIG. 5 |

Primary Examiner—J. V. Truhe
Assistant Examiner—Shelley Wade
Attorney, Agent, or Firm—Weingarten, Schurgin & Gagnebin

[57] ABSTRACT

A wind powered generator rotatable about a vertical axis. A plurality of vertically disposed airfoils are provided, the airfoils being rotatable about a vertical axis parallel to the axis of the generator. The airfoils are selectively latched to be disposed perpendicularly of the wind direction during one phase of their revolution about the generator axis and are selectively unlatched to be permitted to rotate into a position generally parallel to the wind direction during other phases of their revolution. The latching and unlatching of the airfoils is determined by the wind direction and is effected by electronic means which determine the point of latching and unlatching as a function of the wind direction measured by a wind vane. The airfoils may comprise sails composed of a flexible material stretched into a predetermined shape on a frame.

31 Claims, 10 Drawing Figures

WIND POWERED GENERATOR WITH CYCLIC AIRFOIL LATCHING

FIELD OF THE INVENTION

This invention relates generally to wind powered electric generators and more particularly to wind powered electric generators having a vertical axis of rotation and selectively latchable airfoils.

BACKGROUND OF THE INVENTION

For centuries, the energy of the wind has been harnessed by windmills or other wind capturing devices to perform work. In more recent times, wind has been used to drive generators for the production of electricity. Wind powered generators generally fall into one of two classes: either a propeller or turbine type having a horizontal axis, or a vertical axis type having blades or air foils. Generators having a horizontal axis of rotation are probably the most common because, in the past, they have been easier and cheaper to construct. However, windmills having a horizontal axis of rotation are less desirable for several reasons. First, their efficiency is generally fairly low, since they are able to capture only a portion of the air flowing therethrough, and thus are able to extract only a portion of the energy contained in the wind. Secondly, when wind speeds are very high, the end tips of the blades may reach high velocities, thus putting a severe strain on the blade itself. If a larger blade is provided to capture a greater portion of the energy of the air flow, the speed reached by the end tips of the blades increases, thus increasing the stresses on the blades, thereby requiring larger and heavier blades, which further reduce the efficiency of the generator. Thirdly, a yaw control is required to make certain that the blades continually face into the wind. The provision of a yaw control increases the complexity of the generator and reduces its efficiency. Examples of such generators having horizontal axes are found in U.S. Pat. Nos. 3,883,750; 3,942,026; 4,039,848; 3,944,839; 2,388,377; and 2,363,827.

Many difficulties have been encountered with generators having a vertical axis of rotation, and these difficulties have prevented them from being commonly used. The primary difficulty concerns the positioning of the airfoils or blades so that they extract an optimal amount of energy from the wind. Ideally, the airfoils should face the wind when it is desired to give the generator a push, and they should be parallel to the wind flow at other times so as not to impede the rotation of the generator. Also, problems have been encountered in controlling the speed of rotation of such generators. A common solution to this problem is to rotate the individual blades as the entire blade assembly is rotated to position the blades at the proper angle of attack with respect to the wind. Many devices utilize cables, linkages or intricate gearing to maintain the blades at the proper attitude. Examples of such devices are shown in U.S. Pat. Nos. 3,902,072; 2,542,522; 3,793,530; 4,039,848; and 3,743,848. In U.S. Pat. Nos. 3,730,643 and 4,129,787 each blade or sail is pivoted by a servo-motor which responds to changes in the orientation of the blade or sail with respect to the wind. The use of servo-motors draws energy from the system and renders it inefficient, while each of the above-described apparatuses is subject to breakdown because of the intricate gearing involved. Other patents provide other means for positioning the airfoils or blades that do not require an intricate mechanical apparatus, but such devices are not highly efficient. In U.S. Pat. No. 3,995,170, vanes formed of rigged sails fold onto themselves or open up depending upon their orientation to the wind, while U.S. Pat. No. 4,048,947 shows freely rotatable aerodynamic blades balanced by counter weights. Some generators, such as those found in U.S. Pat. Nos. 4,156,580 and 2,667,589 have fixed blade turbine rotors which use shields to deflect the wind flow.

Although each of the above-referenced patents discloses a device for producing electrical power from wind, none of them have been used to produce electrical power on a large scale and on an economically feasible basis, because of the unpredictability of wind and the difficulty in controlling and regulating the output from such a generator. Few of the above generators are capable of withstanding sudden high velocity bursts of wind while still being able to operate smoothly and efficiently at relatively low wind velocities. Furthermore, most of the above generators are not self-starting. Most of the above referenced devices are highly inefficient or complex, as indicated, and some are expensive to manufacture and require continual maintenance. As a result, the electrical energy produced thereby is far more expensive than that which can be obtained from conventional energy sources. Additionally, none of the above generators is particularly aesthetically pleasing, and thus, most detract from the environment in which they are placed.

SUMMARY OF THE INVENTION

It is an object of this invention to provide an efficient wind powered electrical generating device which can function just as effectively and smoothly under high wind conditions as under low wind conditions and which is self-starting. It is also an object of this invention to provide a wind powered electrical generating device which will capture an optimal amount of wind energy passing thereby, and which does not require a large portion of such wind energy to operate its own internal mechanisms. A further object of this invention is to provide a wind powered electrical generating device which is aesthetically pleasing and which may be used in an urban or residential setting to perform a decorative function as well as an energy producing function.

The present invention fulfills the above-described objects and overcomes many of the problems of the prior art by providing selectively latched airfoils. A central vertically disposed shaft rotates about a vertical axis, and has a plurality of air foils revolving about it, each of the airfoils also rotating about a vertical axis parallel to that of the central shaft. Mounted on to the central shaft is a wind vane which senses the wind direction and transmits the information to a computer by means of a shaft encoder. The airfoils are configured to freely rotate into a position parallel to the wind when they are not restrained. Shaft encoders disposed on each airfoil axis are used to determine the relative position of the airfoil about its axis, and another shaft encoder on the central shaft provides information about the position thereof. The airfoils are selectively latched at the optimum time by a computer controlled electronic means so that they are held facing the wind during the leeward side of their revolution about the central shaft, and are selectively unlatched by the electronic means at an optimum time so that they are permitted to rotate into a position parallel to the wind flow during the windward side of their revolution. In this way, the airfoils drive the generator on the leeward side, but provide minimal resistance on the windward side. The airfoils are preferably sails formed of a fabric stretched on a frame, and they are preferably selectively latched and unlatched by means of an electrically actuated solenoid. An electrical generator is driven by means of a drive which is attached to the rotating central shaft. In one embodiment, the airfoils are supported only by the central shaft, while in another embodiment, the airfoils rest on a carriage which travels on wheels on the ground.

BRIEF DESCRIPTION OF THE DRAWING

The objects, advantages and features of this invention will be more clearly appreciated from the following detailed description taken in conjunction with the accompanying drawing in which.

DETAILED DESCRIPTION OF THE PREFERRED EMBODIMENTS

Figure 1:
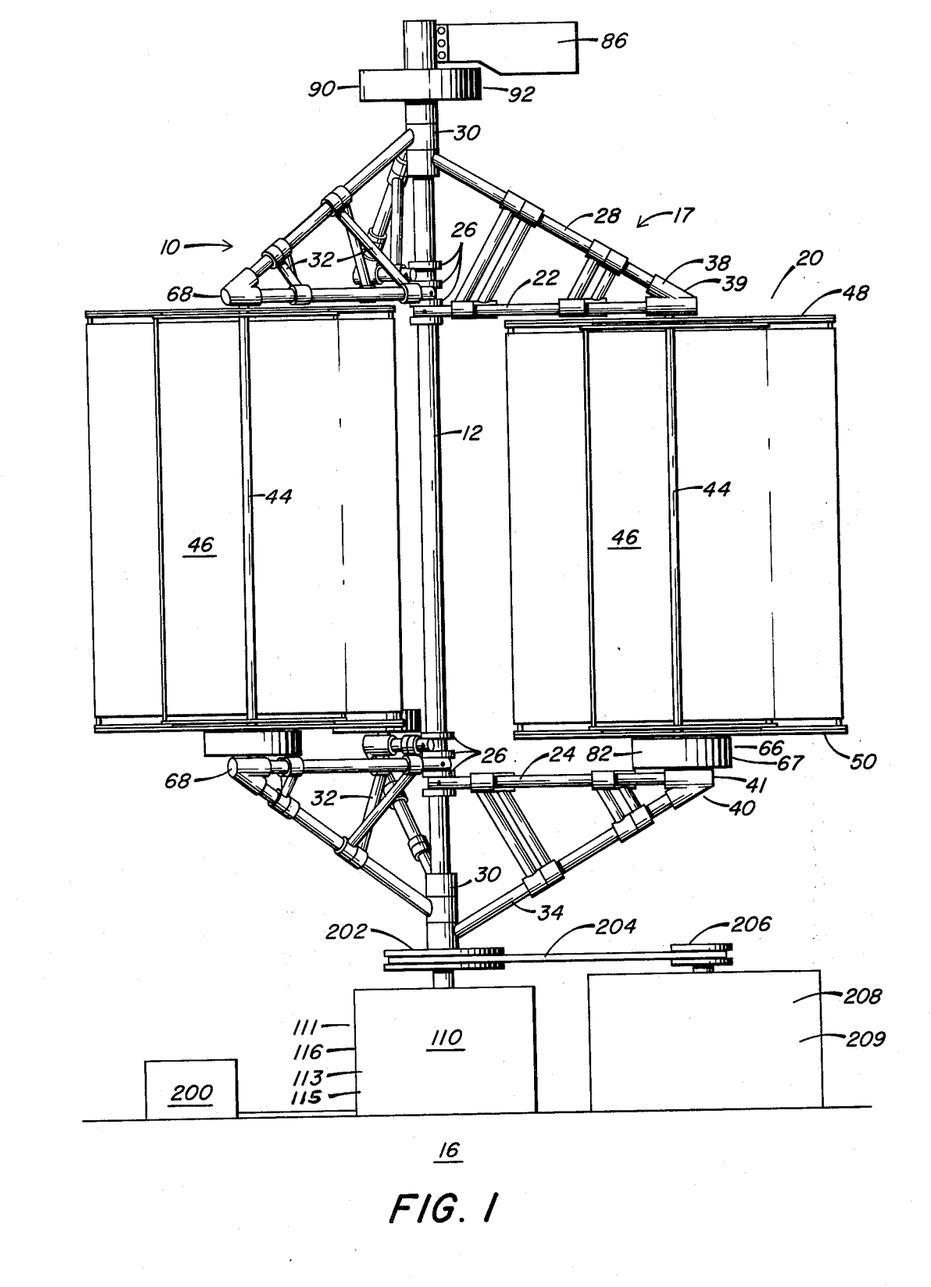
FIG. 1 is a side pictorial view of the wind generator of this invention.

With reference now to the drawing and more particularly to FIG. 1 thereof there is shown a wind powered electrical generating device 10 having a generally cylindrical shaft 12. Shaft 12 is vertically mounted on an essentially horizontal surface 16, and is free to rotate about a vertical axis. Surface 16 may be ground level or it may be an elevated platform or any other stable surface which is exposed to wind. In the preferred embodiment, surface 16 represents ground level, and shaft 12 is journaled in the ground, preferably extending into the ground a distance of several feet for support thereof. Disposed on shaft 12, preferably near surface 16 is a pulley or a gear 202 which rotates with shaft 12 about its axis. A chain or belt 204 driven by pulley or gear 202 is connected to another pulley or gear 206 which drives an electric generator 208. Typically pulley or gear 202 has a greater diameter than pulley or gear 206. A storage module 209 may be provided for storing the electrical energy produced. Storage module 209 typically includes a variable transformer, a full-wave rectifier, a filter and storage batteries.

Disposed about shaft 12 are a plurality of airfoil structures 20 which generate a rotational torque in response to winds of varying velocity to rotate shaft 12 about its vertical axis, thereby producing electrical energy through generator 208. Each airfoil structure 20 is nonrotatably secured to shaft 12 so that structures 20 each revolve about shaft 12 as shaft 12 rotates about its axis and so that the spacing between each structure 20 is maintained constant at all times. Preferably, each structure 20 is equidistant from an adjoining structure 20 and is spaced an equal distance from shaft 12. Typically, there are three airfoil structures 20 disposed about shaft 12 at 120° intervals. Each airfoil structure 20 includes an airfoil 46 freely rotatable about a vertical shaft 44 and supports 17 securing shaft 44 to shaft 12. Supports 17 are configured to provide a low wind resistance necessary for optimum efficiency and yet provide the strength and stability necessary for high wind conditions. Airfoil 46 is shaped to cause it to rotate into a position generally parallel to the prevailing wind flow when in an unlatched condition.

Figure 5:
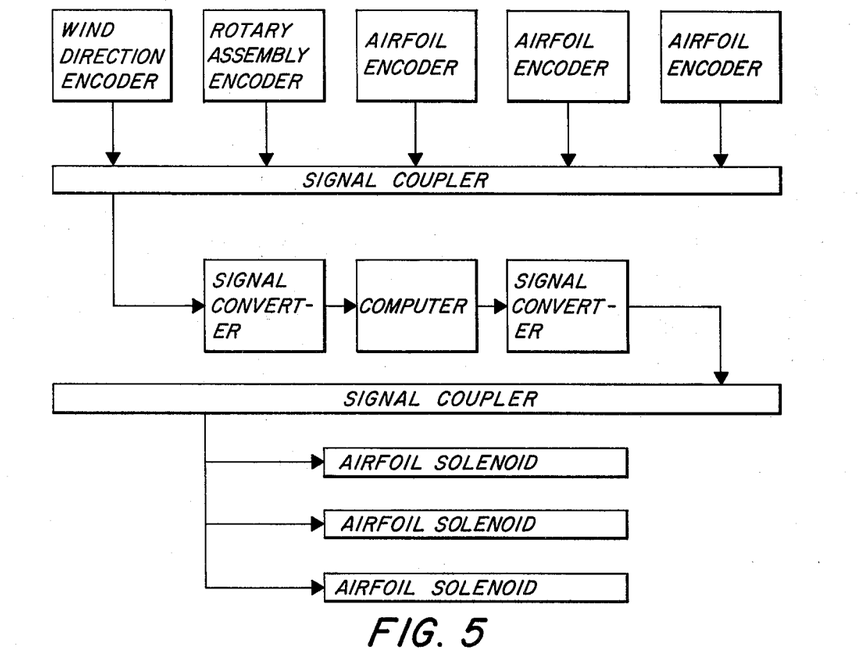
FIG. 5 is a schematic diagram of the electronic circuit of the embodiment of FIG. 1.

A wind vane 86 is provided to determine the wind direction. Wind vane 86 preferably is disposed on top of shaft 12, rotating about shaft 12 in response to changes in the windflow direction. However, wind vane 86 may be located independently of shaft 12 and airfoil structure 20. A wind vane shaft encoder 92 contained within housing 90 provides an electric signal indicative of the wind direction at any given time. A housing 66 is mounted on bracket 41 at the base of shaft 44 of each airfoil structure 20. Within housing 66 is an airfoil shaft encoder 67 which produces an electric signal indicative of the orientation of airfoil 46 with respect to bracket 41 or lower arm 24. Disposed at the base of shaft 12 on surface 16 is another housing 110 containing a rotary assembly shaft encoder 111, a signal converter 116 and a signal coupler 113. Shaft encoder 111 provides an electric signal indicative of the position of shaft 12 relative to surface 16 as shaft 12 rotates about its axis. The position of shaft 12 in turn determines the locations of each airfoil structure 20 relative to surface 16 and to the wind direction. Signal converter 116 analyzes the signal received from shaft encoders 92, 67 and 111. A composite electric signal representative of the signals from shaft encoders 92, 67 and 111 is transmitted to signal coupler 113 which conveys this signal to a computer 200, via a signal converter 116 as shown in FIG. 5. Computer 200 may comprise any conventionally available microcomputer and a typical example is a Motorola model number MC6800. The signal converter may be a conventional parallel to serial converter.

Disposed within housing 66 is an electronically operated latching means 82 which selectively latches and unlatches associated airfoil 46 in response to a signal received from computer 200 via signal coupler 113 and signal converter 115, as shown in FIG. 5. Computer 200 determines when to latch and unlatch airfoils 46 by analyzing the position of airfoil structure 20 and the orientation of airfoil 46 relative to the wind direction. Latching means 82 may be a friction brake, a magnetic brake, such as a stepper motor or a solenoid. Typically, a solenoid is employed, the armature of which engages a notch or hole in a disk, or the spokes of a wheel.

Figures 2, 3:
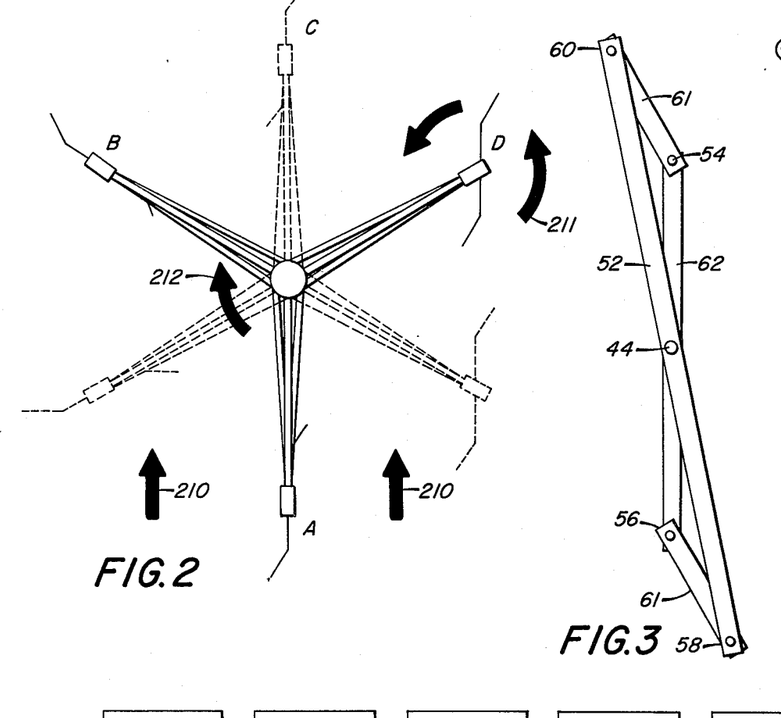
FIG. 2 is a top view of the embodiment of FIG. 1.
FIG. 3 is a top view of the airfoil frame of FIG. 1.

With reference now to FIGS. 2 and 5, a typical example of the operation of the apparatus of FIG. 1 will be described. Arrows 210 indicate the wind direction at a given time, and arrow 212 indicates the direction of rotation of shaft 12. A complete operational circuit may be defined as the path followed by an airfoil structure 20 revolving about shaft 12 from position A, sequentially to positions B, C and D and finally back to A again in response to the force of the wind. This circuit may be divided into two semi-circles or sides; a leeward side from position A to position C wherein the rotational direction of the airfoil structures 20 is substantially in the same direction as the wind flow; and a windward side from position C to position A wherein the rotational direction of the airfoil structures 20 is substantially opposite that of the wind flow. As an airfoil structure 20 reaches position A in FIG. 2, where airfoil structure 20 faces into the wind and airfoil 46 is aligned parallel to the wind, the airfoil 46 is between the windward and leeward sides. It is at this point that airfoil 46 is latched by latching means 82 into a fixed position. Airfoil 46 remains latched until airfoil structure 20 approximately reaches position C of FIG. 2. On the leeward side, a surface of airfoil 46 faces the wind an provides a torque to drive shaft 12. Even as airfoil structure 20 reaches position B, airfoil 46 still provides sufficient torque to power device 10, although not as much as previously, and thus airfoil 46 is retained in the same latched condition. Also, as one airfoil structure 20 reaches position B, another structure 20 is passing position A and its airfoil 46 is latched to supplement the torque provided by structure 20 at position B. As airfoil structure 20 reaches position C, between the leeward and windward sides, airfoil 46 is aligned parallel to the wind flow and no longer provides torque. Latching means 82 automatically unlatches airfoil 46 in response to a signal from computer 200. As airfoil structure 20 rotates through the windward side, airfoil 46 is permitted to rotate freely about shaft 44 in its unlatched condition. The shape of airfoil 46 causes it to rotate into a position parallel to the wind flow, as shown by arrow 21 at position D, so that airfoil 46 creates minimal wind resistance. As airfoil 46 moves from position D to position A, it retains the orientation shown at position D rotating about shaft 44, as shown by arrow 211. As airfoil 46 reaches position A, it is thus automatically in the proper orientation to be latched, as previously described.

A preferred configuration of supports 17 is shown in FIG. 1, and includes a pair of upper arms 22 and a pair of lower arms 24. The two arms 22 and the two arms 24 are attached to opposite sides of shaft 12 at one end thereof to capture shaft 12 therebetween. The pair of arms 22 and the pair of arms 24 extend from shaft 12 at a 90° angle and converge at respective opposite ends 38 and 40 to form a triangle, as shown in FIG. 2. Ends 38 are secured together by bracket 39 and ends 40 are secured by bracket 41. Arms 22 and 24 may be bolted to outer shaft 12 or they may be connected in any other suitable manner. A collar 26 is provided along shaft 12 on either side of each pair of arms 22 and 24 to maintain the position thereof and to separate the arms 22 or 24 associated with one airfoil structure 20 from the arms 22 or 24 associated with the other airfoil structures 20 along shaft 12. A support arm 28 may be provided for each pair of upper arms 22 and a support arm 34 may be provided for each pair of arms 24. Support arms 34 and 38 extend from outer shaft 12 at an acute angle therewith to respective ends 38 and 40 where they are secured thereto by respective bracket 39 and 41. Support arms 28 and 34 may be attached to shaft 12 by means of coupling 30. A plurality of braces 32 may also be provided between support arm 28 and 34 and respective arms 22 and 24 on each airfoil structure 20. Two of such braces 32 for each arm 22 or 24, are preferred although any suitable number may be used.

Captured between bracket 39 of upper arms 22 and bracket 41 of lower arms 24 is vertical shaft 44 which is substantially parallel to shaft 12. Shaft 44 is journaled at each end in bearings 68 disposed in bracket 39 and in bracket 41 which permit shaft 44 to rotate about its vertical axis. Attached to shaft 44 is airfoil 46 which is disposed symmetrically about shaft 44 and rotates therewith. Airfoil 46 is generally S-shaped, as shown in FIG. 2, and this configuration provides an aerodynamic lift.

Figure 4:
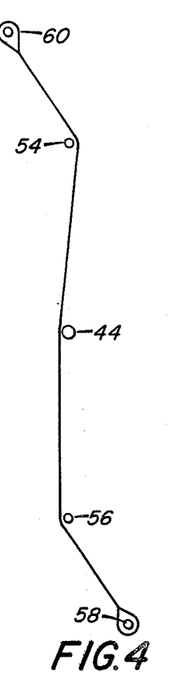
FIG. 4 is a cross-sectional view of an airfoil of FIG. 1.

A typical airfoil 46 is shown in FIGS. 3 and 4. It should be noted that the airfoil disclosed in FIGS. 3 and 4 is one possible embodiment and that any other airfoil construction may be utilized. Airfoil 46 has an upper frame 48 and a lower frame 50 which are symmetrically disposed about shaft 44. Upper and lower frames 48 and 50 have the same general S-shaped configuration. Each frame comprises a pair of linear members 52 and 62 crossing at their respective centers, and a pair of shorter linear members 61 connecting each end of member 52 with an adjacent end of member 62. Member 52 acts as a brace, and airfoil 46 assumes the shape of member 62 and attached members 61. The sharpness of the curve of the S-configuration of airfoil 46 may be altered to conform to the needs of a particular situation merely by varying the lengths of members 62 or 61 and by pivoting members 61 about their connection with member 62. A plurality of masts 54, 56, 58 and 60 extend between upper frame 48 and lower frame 50. Masts 58 and 60 are disposed at the tips of members 61 where they are joined by member 52, masts 54 and 56 disposed at the junction of members 61 and 62 generally intermediate mast 60 and shaft 44, and shaft 44 and mast 58 respectively. Mast 54, 56, 58 and 60 are all generally parallel to shaft 44. A suitable fabric material is wrapped around masts 54, 56, 58 and 60 and shaft 44 to form the airfoil. Typically, the fabric is initially secured to mast 60, looped around mast 54, then wrapped around shaft 44, looped around mast 56 and finally secured to mast 58.

Figure 7:
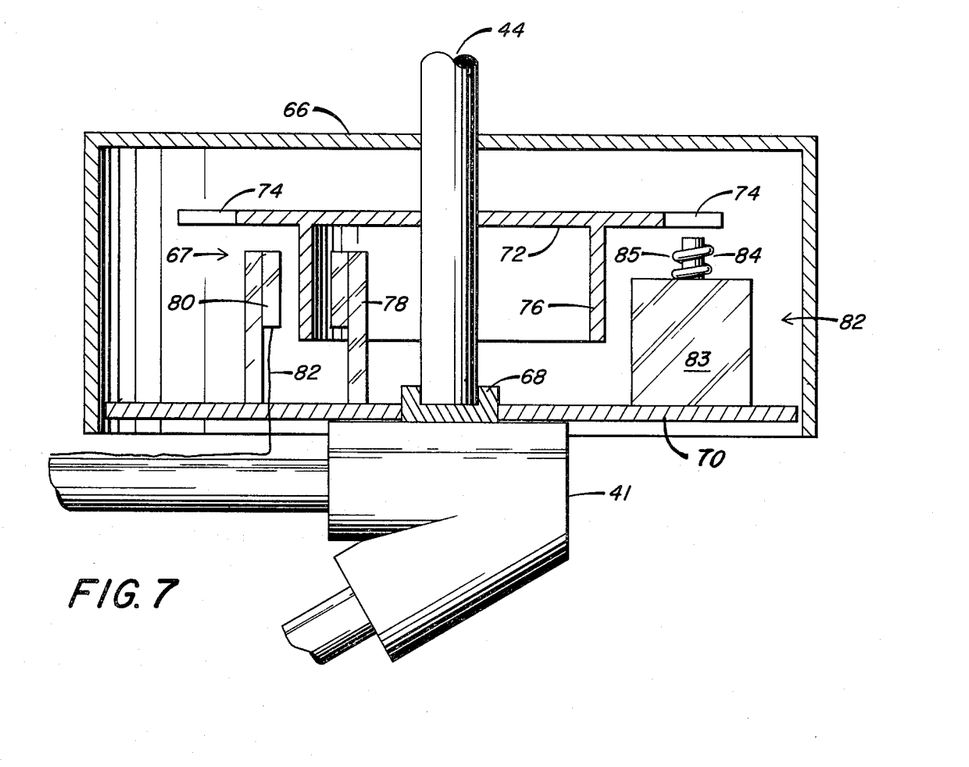
FIG. 7 is a cross-sectional view of the airfoil encoder of the embodiment of FIG. 1.

A typical configuration of shaft encoder 67 and latching means 82 is shown in cross-section in FIG. 7. Housing 66 surrounds shaft encoder 67 and latching means 82 and shaft 44 extends through housing 66 and rests on a thrust bearing 68 on top of bracket 41. A platform 70 also rests on bracket 41 and extends outwardly therefrom, surrounding thrust bearing 68. Platform 70 is non-rotatably attached to bracket 41. Fixedly secured to shaft 44 and rotatable therewith is housing 66 and a substantially circular disc 72 having a plurality of evenly spaced notches 74 displayed about the perimeter thereof. In a preferred embodiment, there are 32 notches, however any number of notches may be used, depending upon degree of sensitivity desired. Secured to the underside of disc 72 and rotatable therewith, is a code cylinder 76 having a plurality of tracks, preferably five with portions of each track being cut out to form a binary code having the same number of digits as tracks. Affixed to platform 70 is a bank of lamps 78, the number of lamps 78 being equal to the number of tracks in the code cylinder, preferably five. Disposed opposite the bank of lamps 78 is a bank of photocells 80, the number of photocells 80 being equal to the number of lamps 78. Lamps 78 and photocells 80 are positioned so that code cylinder 76 is positioned therebetween and as it rotates. A five bit coded signal is thus generated by rotation of code cylinder 76 with shaft 44 which is indicative of the orientation of airfoils 46. The signal is received by the bank of photocells 80 and transmitted therefrom through wires 81 to signal converter 116.

Also disposed on platform 70 is latching means 82 which typically includes a solenoid 83. Solenoid 83 preferably is disposed on an opposite side of shaft 44 from lamps 78 and photocells 80. Solenoid 83 has an armature 84 which is biased upwardly toward disc 72 by a spring 85. Armature 84 is held in a normally withdrawn position, as shown in FIG. 7, by the actuation of solenoid 83. When it is desired to latch airfoil 46, solenoid 83 is de-actuated at the appropriate time by a signal from computer 200, and armature 84 is permitted to move upwardly and into engagement with a selected notch 74 under the influence of spring 85. As armature 84 engages a notch 34, disc 72 and thus shaft 44 are prevented from rotating, thus latching associated air foil 46 in a desired position. In a similar manner, upon a signal from computer 200, solenoid 82 may be actuated to withdraw armature 84 to selectively unlatch disc 72 and thus shaft 44 and air foil 46 at the appropriate position during the revolution of airfoil structure 20 about shaft 12.

Figure 6:
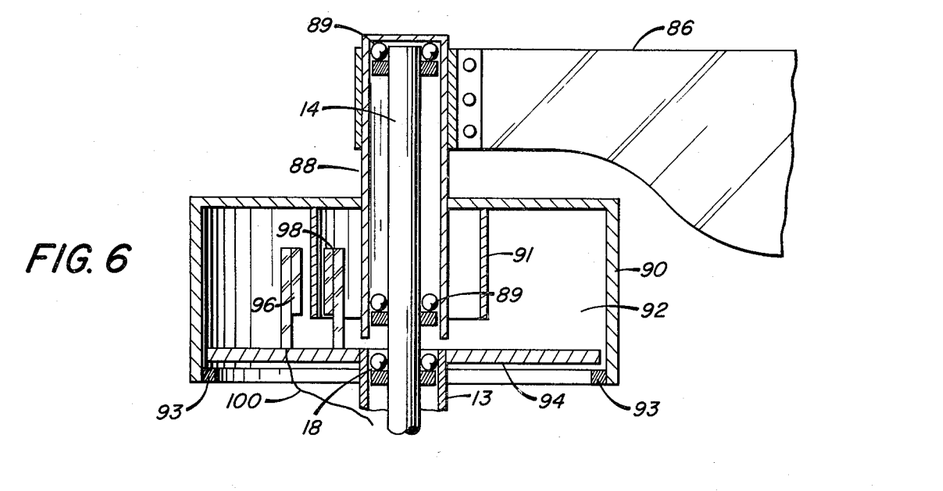
FIG. 6 is a cross-sectional view of the wind vane encoder of the embodiment of FIG. 1.
Figure 8:
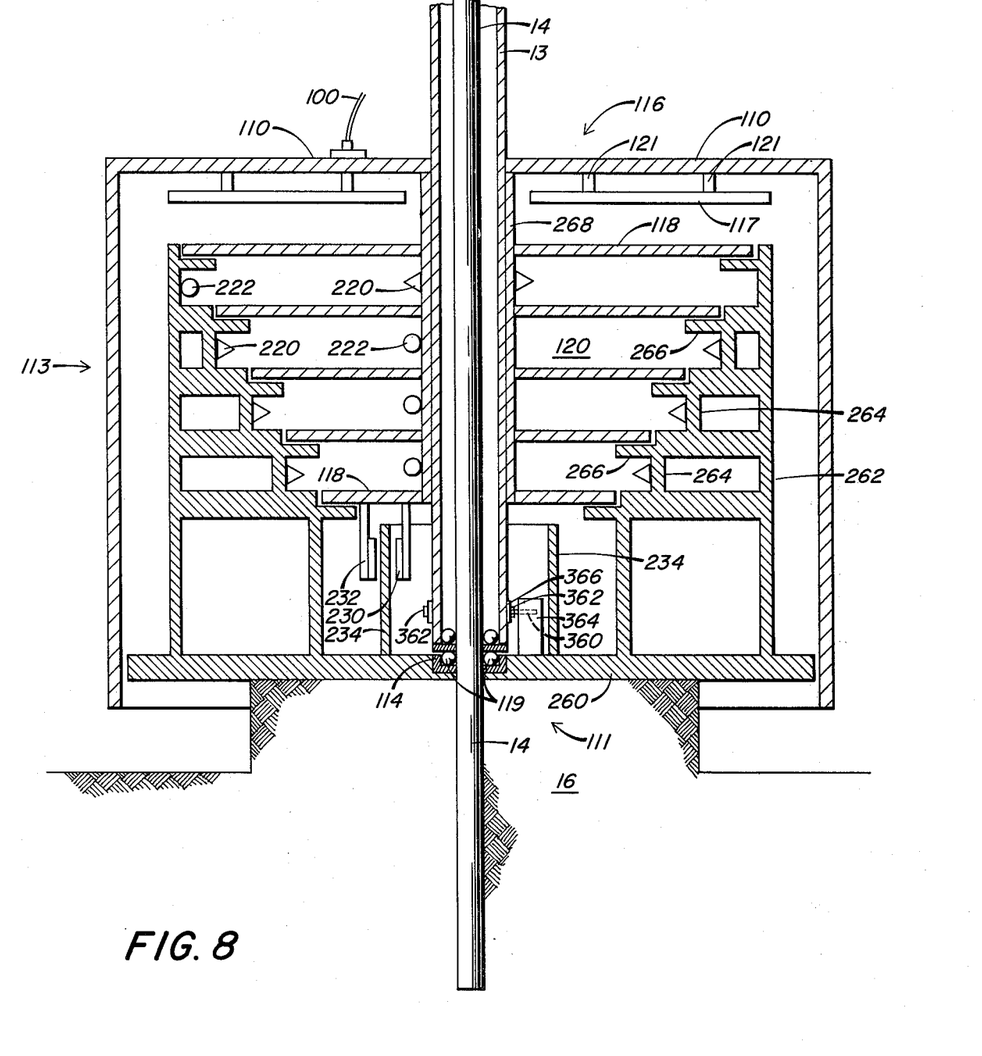
FIG. 8 is a cross-sectional view of the main control module of the embodiment of FIG. 1.

As shown in FIGS. 6 and 8, shaft 12 is typically comprised of two generally coaxial, cylindrical shafts, inner shaft 14 and outer shaft 13. Inner shaft 14 is stationary and is secured onto surface 16 or driven into the ground as shown in FIG. 8. Outer shaft 13 rotates around inner shaft 14 about their common axis, and inner shaft 14 is journaled within outer shaft 13 by means of a series of bearings 18 which maintain the proper separation between shafts 13 and 14 and prevent vibrational motion.

With reference now to FIG. 6, one embodiment of shaft encoder 92 and wind vane 86 will be described. Wind vane 86 is preferably disposed on a rotatable shaft 88 which is concentrically mounted on the top end of shaft 14. Bearings 89 separate shaft 88 from shaft 14 and permit wind vane 86 to pivot in response to changes in the wind. Secured to shaft 88 is housing 90 having a code cylinder 91 attached to an upper surface thereof and adapted to rotate with shaft 88 in response to changes in wind direction. Code cylinder 91 is similar to code cylinder 76 and operates in a similar manner. Secured to the top of shaft 13 are rotatable therewith is a platform 94. The top main bearing 18 is typically positioned between shafts 13 and 14 at the level of platform 94. Stops 93 are provided on the lower edge of housing 90 below platform 94 to prevent housing 90 and thus wind vane 86 from being lifted off shaft 14, and also to seal the housing from the environment. Mounted onto platform 94 and projecting upwardly therefrom is an array of photocells 96, and an array of lamps 98 spaced from and facing photocells 96. Code cylinder 91 is positioned such that it remains between the array of lamps 98 and the array of photocells 96 at all times during its rotation with shaft 88 about shaft 14. Lamps 98 and photocells 96 are adapted to receive a binary coded signal which is indicative of the wind direction detected by wind vane 86. This signal is carried by wires 100 to signal converter 116. It should be noted that platform 94, photocells 96 and lamps 98 all rotate with shaft 13, so that wires extending therefrom can be carried along shaft 13 and down to the base thereof. Thus, the signal received from shaft encoder 92 must be compensated for the rotation of shaft 13.

With reference now to FIG. 8, one embodiment of the shaft encoder 111, the signal coupler 113, and the signal converter 116 will be described. Shaft 13 rests on a thrust bearing 114, and rotates about shaft 14. A second bearing 119 resides between the exterior of shaft 13 and the interior of shaft 14 just above thrust bearing 114. Shaft 13 is electrically connected to a source of power, preferably 12 volts, to provide the necessary electricity to operate solenoids 82 and other electrical components of device 10. The electric current may be supplied through a spring-loaded brush 360 mounted in insulation block 364 that contacts a metal sleeve 362 disposed on shaft 13 and surrounded by insulator 366, or in any other manner known to those skilled in the art. A cylindrically shaped housing 110 is secured to shaft 13 and is rotatable therewith. Signal converter 116 is typically mounted on a circular printed circuit board 117 suspended from the top of housing 110 by spacers 121. Wires 100 coming from shaft encoder 92 and shaft encoder 67 are routed down shaft 13, through housing 110 and to signal converter 116.

Below signal converter 116 is signal coupler 113 which will now be described with reference to FIG. 8. Attached to shaft 13 and extending outwardly in a horizontal direction therefrom, are a plurality of five circular baffle covers 118 which define a plurality of annular chambers 120. Each chamber 120 has an interior end wall 268 adjacent shaft 13 and parallel thereto. Preferably, the radial extent of annular chambers 120 decreases from top to bottom, as shown in FIG. 8. Non-rotatably secured to surface 16 and disposed around bearing 114 is a circular platform 260, having a radius somewhat less than that of housing 110. Mounted onto platform 260 is a baffle structure 262 which defines a plurality of circular endwalls 264 for chambers 120. Associated with each end wall 264 is an annular lip 266 which extends inwardly toward shaft 13 and overlaps adjacent baffle covers 118 to prevent the passage of light to and from chambers 120. Disposed within each chamber 120 is at least one photocell 222 and at least two lamps 220. Lamps 220 and photocells 222 are disposed opposite from one another and are spaced a specified distance within chamber 120. In one typical embodiment, the topmost chamber 120, as shown in FIG. 8, is provided with a photocell 222 on endwall 264 and two lamps 220 on interior endwalls 268. Topmost chamber 120 is adapted for the transmission of a signal from the signal converter 116 to computer 200 representative of the information received from shaft encoders 67, 92 and 111. The remaining three chambers 120 are provided with at least two lamps 220 on endwalls 264, and at least one photocell on interior endwalls 268. The remaining three chambers 120 are adapted for transmitting signals from computer 200 and signal converter 115 to each solenoid 82 associated with an airfoil 46.

Shaft encoder 111 is disposed at the base of shaft 14 within housing 110 and surrounding bearings 114 and 119. Shaft encoder 111 operates in a manner similar to previously described shaft encoders, and comprises an array of lamps 230 suspended from the lowermost baffle cover 118, and an array of photocells 232 also suspended from the lowest baffle cover 118. Lamps 230 and photocells 232 rotate with shaft 13. Code cylinder 234 is mounted onto platform 260 and is positioned so as to pass between lamps 230 and photocells 232, as they rotate about shaft 14, thus providing a digital code indicative of the relative position of shaft 13 in its rotation about its axis. The signal from shaft encoder 111 is then transmitted to computer 200 via signal converter 116 and signal coupler 113.

Figure 9:
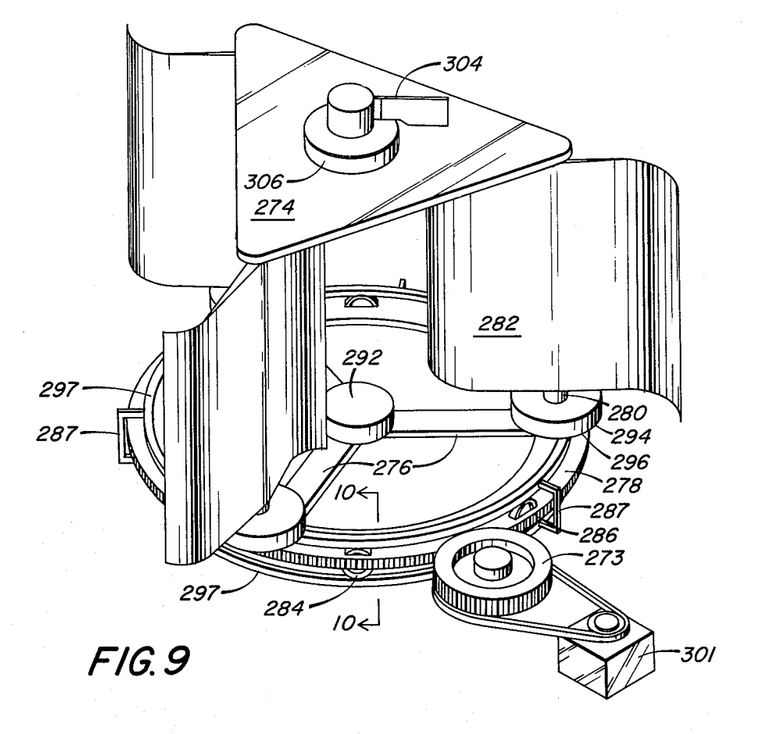
FIG. 9 is a pictorial view of another embodiment of the invention.
Figure 10:
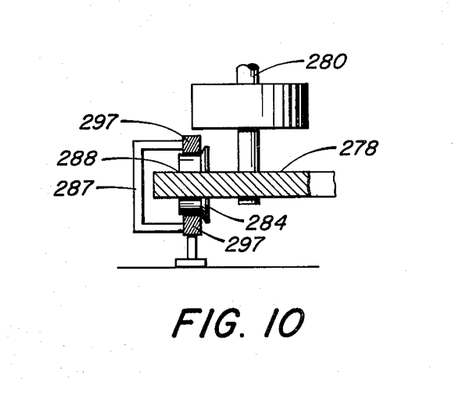
FIG. 10 is a cross-sectional view along the line 10—10 of FIG. 9.

An alternative embodiment of the above described invention is shown in FIGS. 9 and 10. Rotatable about a vertical axis passing through the center thereof are an upper triangular frame 274 and a lower generally circular frame 276. Disposed about the perimeter of frame 276 is an annular shaped member 278. Equally spaced along member 278 about the perimeter of frame 276 are a series of vertically mounted shafts 280 which rest on thrust bearings on member 278. Preferably, as shown in FIG. 9, there are three of such shafts 280 and they are disposed at 120° intervals, although one or more shafts 280 could be employed. Rotatably mounted on each shaft 280 is an airfoil 282 which is symmetrically disposed about shaft 280. The top of each shaft 280 is anchored to a corner of frame 274, and each shaft 280 is preferably journaled in a bearing within frame 274. Disposed at the base of each shaft 280 is a shaft encoder 294 and an electronic latching mechanism 296. Frame 276 rides on a plurality of wheels 284 which rotate about shafts 286 journaled within wheel slots 288. Wheels 284 preferably are captured between and travel along relatively frictionless parallel tracks 297 which are disposed below frame 276 and which are separated by support 289. Tracks 297 serve both to guide wheels 284 and to retain frames 274 and 276 in a desired location. A plurality of equally spaced serrations is provided about the outer perimeter of member 278. At least one gear 273 having a vertical axis of rotation is provided about the perimeter of frame 276 and is adapted to mesh with the serrations on frame 276 so that rotation of frame 276 drives gear 273. Gear 273 in turn is connected to one generator 301 by means of a belt or chain drive. A shaft encoder 292 is disposed at the center of frame 276 to provide information to a computer (not shown) on the rotational position of frame 276. A wind vane 304 disposed on top of frame 274 and is pivotable about the axis of rotation of frame 274 to provide a reading of the prevailing wind direction. A shaft encoder 306 provides an electrical signal indicative of the wind direction relative to frame 274, which is rotating about its axis. The computer then determines the absolute wind direction from the information and from the rotational position of frame 276. A central shaft may also be provided, in a manner similar to the embodiment of FIG. 1. If such a shaft were employed, it would be positioned along the axis of rotation of frames 274 and 276, and journaled in a thrust bearing in surface 272 and it would serve to anchor frame 274, thus obviating tract 297.

The operation of the embodiment of FIG. 9 is identical to that of the previously described embodiments and will only be briefly discussed here. The relative position of air foils 282 is provided by shaft encoder 294, the relative position of each airfoil 282 about shaft 270 is provided by shaft encoder 292 and the wind direction is provided by shaft encoder 306. The information provided thereby is utilized by a computer to determine when each airfoil 282 is on the leeward side for activating latching means 296 as previously described. Each airfoil 282 is later unlatched by latching means 296 as airfoil 282 reaches the windward side of its revolution about shaft 270. Each airfoil 282 has a shape similar to that of airfoil 46 so that airfoil 282 freely rotates into a direction parallel to the wind when in an unlatched condition. In all other respects, the operation of the embodiment of FIG. 9 is identical to that of FIGS. 1 through 8.

The dimensions of airfoils 46 and 282 are dependent upon the power requirements and the structural limitations of the particular application. They can be made as large as desired or as small as desired. It should be noted that the energy required to latch and unlatch the airfoils 46 and 282 is minimal. Because of the relatively large size of the airfoils as compared to the size of the rest of the apparatus, a large percentage of the available energy may be captured from the wind utilizing a relatively lightweight apparatus. Ths shape of the airfoils also allows them to catch an optimum amount of wind on the leeward side and also permits them to rotate into a direction parallel to the wind to generate a minimum amount of resistance when they are on the windward side. Thus, the drag or energy loss of a generator is minimal. Because the airfoils are light in weight, they may be rotated in a light wind at high efficiency, and smoothly without jerking. When the wind is very strong, the generator will continue to operate at a high efficiency, because the sails are composed of a strong material, such as reinforced nylon which will not shred or rip during high wind conditions. Furthermore, because the airfoils catch a high percentage of the wind, they have a slower rotational speed for a given torque than a turbine or propeller. Thus, the generator is operable under any wind conditions. The selective latching feature also permits the generator to start on its own without an assist. The use of sails is highly decorative, and is aesthetically pleasing to the eye. The sails may be provided with designs or other ornamentation to make them even more pleasing or to blend in with the background.

In view of the above description, it is likely that modifications and improvements will occur to those skilled in the art which are within the scope of this invention.

What is claimed is:

1. A wind powered generator comprising:
   support means;
   a framework rotatable with respect to said support means about a central axis;
   a plurality of airfoil shafts, each airfoil shaft being adapted to revolve in a circle with a fixed radius about said central axis through a leeward sector wherein said airfoil shafts move in generally the same direction as a windflow direction and through a windward sector wherein said airfoil shafts move in a direction generally opposite of said windflow direction;
   an airfoil associated with each airfoil shaft and having a surface symmetrically disposed about its associated airfoil shaft, each of said airfoils being rotatable about its associated airfoil shaft and being adapted to revolve with its associated airfoil shaft about said central axis, each of said airfoil surfaces being configured to rotate into a position generally parallel to said windflow direction when permitted to rotate freely about its associated airfoil shaft; and
   means for selectively latching each of said airfoils in said entire leeward sector in a single, fixed torque producing position generally parallel to said radius of said circle of revolution to generate wind-produced torque about said central axis, and for selectively unlatching each of said airfoils in at least a portion of said windward sector to permit each unlatched airfoil to rotate freely into a position generally parallel to said windflow direction.

2. A wind powered generator according to claim 1 further comprising:
   electric power generating means; and
   means for transmitting torque produced by each of said airfoils about said central axis to said electric power generating means.

3. A wind powered generator according to claim 2 further comprising electric power storage means.

4. A windflow powered generator according to claim 1 further comprising wind direction detection means.

5. A windflow powered generator according to claim 4 wherein said wind direction detection means comprises a wind vane freely rotatable about said central axis in response to changes in said wind flow direction.

6. A wind powered generator according to claim 4 further comprising:
   means associated with said windflow direction detection means for producing a signal indicative of said windflow direction;
   means associated with each of said airfoil shafts for producing a signal indicative of the orientation of its associated airfoil surface with respect to said framework;
   means associated with said framework for producing a signal indicative of the position of said framework with respect to said support means; and
   computer means for receiving signals from said signal producing means associated with said windflow direction detection means, said signal producing means associated with each of said airfoil shafts and said signal producing means associated with said framework, for determining therefrom the location of said leeward sector and said windward sector and for controlling said latching and unlatching means.

7. A wind powered generator according to claim 6 or 1 wherein said signal-producing means associated with said windflow direction detection means, said signal producing means associated with each of said airfoil shafts, and said signal producing means associated with said framework each comprise an individual shaft encoder.

8. A wind powered generator according to claim 7 where each of said shaft encoders comprise:
   a plurality of lamps;
   an array of photoelectric cells disposed in a fixed, spaced, confronting relationship with said plurality of lamps, and being adapted to receive light from said array of photocells;
   a cylinder disposed between said array of photocells and said plurality of lamps and having light transmissive portions thereon forming a binary code, said cylinder being mounted independently of said array of photocells and of said plurality of lamps;
   means for selectively moving one of said code cylinder, and said array of photoelectric cells together with said plurality of lamps independently of the other of said code cylinder and of said array of photoelectric cells together with said plurality of lamps in response to movement of the associated one of said airfoil shafts, said windflow direction detection means and said framework.

9. A wind powered generator according to any one of claims 1, 4 or 6 wherein said latching means comprise an electrically actuated solenoid associated with each of said airfoil shafts.

10. A wind powered generator according to claim 9 wherein said latching means further comprise:
    a disc attached to each of said airfoil shafts and rotatable therewith, said disc having a plurality of openings arranged thereon; and
    armature means associated with each of said solenoids and adapted for being driven by its associated solenoid into one of said openings of said disc for latching of its associated airfoil and being retracted by its associated solenoid for unlatching of its associated airfoil.

11. A wind powered generator according to claim 1 wherein said framework comprises a plurality of spaced members permitting air to pass freely therethrough.

12. A wind powered generator according to claim 1 wherein each of said airfoil surfaces has a generally S-shaped cross-sectional configuration.

13. A wind powered generator according to claim 1 wherein each of said airfoils comprises:
    a plurality of elongated arms disposed parallel to said airfoil shaft;
    an upper frame interconnecting upper ends of each of said arms;
    a lower frame interconnecting lower ends of each of said arms; and
    a flexible material tightly stretched between each of said arms and said airfoil shaft.

14. A wind powered generator according to claim 13 wherein a cross-sectional configuration of each airfoil may be varied by altering the shape of said upper frame and said lower frame for adaptation to specific wind conditions.

15. A wind powered generator according to claim 6 further comprising electrooptical means for transmitting said signal indicative of said windflow direction, each of said signals indicative of the orientation of an associated airfoil surface with respect to said framework, and said signal indicative of the position of said framework with respect to said support means to said computer and for transmitting signals from said computer to each of said latching means.

16. A wind powered generator according to claim 1 further comprising a central shaft coaxial with said central axis and attached to said framework, said central shaft being journaled in said support means for rotation with said framework about said central axis.

17. A wind powered generator according to claim 16 wherein said framework is supported entirely by said central shaft and is spaced from said support means a predetermined distance.

18. A wind powered generator according to claim 1 further comprising:
    a first central shaft journaled in said support means coaxially with said central axis;
    a second central shaft concentrically disposed with respect to said first central shaft and spaced therefrom a predetermined distance;
    a plurality of bearings between said first shaft and said second shaft for permitting relatively frictionless rotation of said second shaft about said first shaft and for separating said first shaft from said second shaft.

19. A wind powered generator according to claim 18 wherein said framework is secured to said second shaft and is rotatable therewith about said first shaft.

20. A wind powered generator according to claim 19 further comprising wind vane means secured to the upper end of said first central shaft and rotatable about said central axis in response to changes in said windflow direction for providing an indication of said windflow direction.

21. A wind powered generator according to claim 20 further comprising an electro optical shaft encoder for providing a signal indicative of said windflow direction.

22. A wind powered generator according to claim 21 wherein said encoder comprises:
    a plurality of light-emitting lamps rotatable with said second shaft about said central axis;
    an array of photocells in a fixed, spaced, confronting relationship with said lamps, said array of photocells being rotatable with said lamps about said central axis of said array of photocells being adapted to receive light from said lamps and produce a signal in response thereto; and a code cylinder having an axis coincident with said central axis and being rotatable about its axis in response to movement of said wind vane, said code cylinder having a plurality of light transmissive portions forming a digital code to generate a pattern of light passing therethrough indicative of the windflow direction.

23. A wind powered generator according to claim 1 further comprising:

track means disposed on said support means and secured thereto, said track means forming a circle whose center coincides with said central axis;

wheel means journaled in said framework and adapted to ride on said track means as said framework rotates about said central axis.

24. A wind powered generator according to claim 23 further comprising wind vane means rotatable about said central axis in response to changes in said windflow direction for providing an indication of said windflow direction.

25. A wind powered generator according to claim 24 further comprising:

first electrooptical means associated with said framework for providing a signal indicative of the position of said framework with respect to said support means;

second electrooptical means associated with said wind vane means for providing a signal indicative of said windflow direction;

a plurality of third electrooptical means, each of said third electrooptical means being associated with one of said airfoil shafts for providing a signal indicative of the orientation of its associated airfoil surface with respect to said framework; and computer means for receiving signals from said first electrooptical means, said second electrooptical means, and each of said third electrooptical means and for determining therefrom the location of said leeward sector and said windward sector and for controlling said latching and unlatching means.

26. A wind powered generator according to claim 25 wherein said latching and unlatching means comprise:

a disc secured to each of said airfoil shafts and rotatable therewith, said disc having a plurality of openings therein;

a solenoid associated with each of said discs and actuated in response to a signal from said computer means to drive an armature into engagement with one of said openings in its associated disc to latch its associated airfoil and airfoil shaft, and deactuated upon a signal from said computer means to withdraw its associated armature from said one of said openings in its associated disc to unlatch its associated airfoil and airfoil shaft.

27. A wind powered generator according to claim 23 further comprising:

first gear means disposed on the perimeter of said framework;

second gear means disposed independently of said framework and adapted to be driven by said first gear means; and electric power generating means driven by said second gear means.

28. A wind powered generator, comprising:

horizontal support means;

a vertical central shaft journaled in said horizontal support means for free rotation thereof about a vertical central axis;

a framework supported by said central shaft and rotatable with said central shaft about said vertical axis, said framework including spaced support members;

a plurality of vertical airfoil shafts journaled in said framework for free rotation thereof about a vertical airfoil axis, said airfoil shafts revolving about said central shaft through a leeward sector wherein said airfoil shafts move in generally the same direction as the windflow direction and through a windward sector wherein said airfoil shafts move in a direction generally opposite of the windflow direction;

an airfoil associated with each airfoil shaft and having a surface symmetrically disposed about its associated airfoil shaft, each of said airfoils freely rotating with its associated airfoil shaft about said airfoil axis and revolving with its airfoil shaft about said central shaft, each of said airfoil surfaces having a generally S-shaped horizontal cross-sectional configuration adapted to produce wind-generated torque about said central shaft when latched nonparallel to said windflow direction and to permit said airfoil to rotate freely into a position generally parallel to said windflow direction when unlatched;

a wind vane rotatable about said central shaft in response to said windflow direction;

shaft encoder means associated with said wind vane for producing a signal indicative of said windflow direction;

shaft encoder means associated with said central shaft for producing a signal indicative of the relative position of said framework with respect to said horizontal support means;

an airfoil shaft encoder associated with each airfoil shaft for producing a signal indicative of the relative orientation of its associated airfoil with respect to same framework;

solenoid means associated with each of said airfoils and actuable for selectively latching its associated airfoil in said leeward sector in a fixed torqueproducing position wherein said airfoil surface is nonparallel to said windflow direction, and for selectively unlatching its associated airfoil in said windward sector;

computer means for receiving signals from said wind vane shaft encoder means, from said central shaft shaft encoder means and from said airfoil shaft encoder means for determining the location of said windward sector and said leeward sector and for actuating and deactuating each of said solenoid means; and electric power generating means driven by means connected to said central shaft.

29. A wind powered generator comprising:

support means;

a framework rotatable with respect to said support means about a central axis;

a plurality of airfoil shafts, each of said airfoil shafts being adapted to revolve about said central axis through a leeward sector wherein said airfoil shaft moves in generally the same direction as a windflow direction and through a windward sector wherein said airfoil shaft moves in a direction generally opposite of said windflow direction;

an airfoil associated with each airfoil shaft and having a surface symmetrically disposed about its associated airfoil shaft, each of said airfoils being rotatable about its associated airfoil shaft and being adapted to revolve with its associated airfoil shaft about said central axis, each of said airfoil surfaces being configured to rotate into a position generally parallel to said windflow direction when permitted to rotate freely about its associated airfoil shaft;

means for selectively latching each of said airfoils in said leeward sector in a fixed torque-producing position wherein said airfoil surface is nonparallel to said windflow direction to generate wind-produced torque about said central axis, and for selectively unlatching each of said airfoils in said windward sector to permit the unlatched airfoil to rotate freely into a position generally parallel to said windflow direction;

windflow direction detection means;

means associated with said windflow direction detection means for producing a signal indicative of said windflow direction;

means associated with each of said airfoil shafts for producing a signal indicative of the orientation of its associated airfoil surface with respect to said framework;

means associated with said framework for producing a signal indicative of the position of said framework with respect to said support means; and computer means for receiving signals from said signal producing means associated with said windflow direction detection means, said signal producing means associated with each of said airfoil shafts and said signal producing means associated with said framework for determining the location of said leeward sector and said windward sector and for controlling said latching and unlatching means.

30. A wind powered generator comprising:

support means;

a framework rotatable with respect to said support means about a central axis;

a plurality of airfoil shafts, each of said airfoil shafts each being adapted to revolve about said central axis through a leeward sector wherein said airfoil shaft moves in generally the same direction as a windflow direction and through a windward sector wherein said airfoil shafts move in a direction generally opposite of said windflow direction;

an airfoil associated with each airfoil shaft and having a surface symmetrically disposed about its associated airfoil shaft, each of said airfoils being rotatable about its associated airfoil shaft and being adapted to revolve with its associated airfoil shaft about said central axis, each of said airfoil surfaces being configured to rotate into a position generally parallel to said windflow direction when permitted to rotate freely about its associated airfoil shaft;

means for selectively latching each of said airfoils in said leeward sector in a fixed torque-producing position wherein said airfoil surface is nonparallel to said windflow direction to generate wind-produced torque about said central axis and for selectively unlatching each of said airfoils in said windward sector to permit the unlatched airfoil to rotate freely into a position generally parallel to said windflow direction;

track means disposed in fixed relation to said support means, said track means forming a circle whose center coincides with said central axis;

wheel means journaled in said framework and adapted to ride on said track means as said framework rotates about said central axis;

wind vane means rotatable in response to changes in said windflow direction for providing an indication of said windflow direction;

first electrooptical means associated with said framework for providing a signal indicative of the position of said framework with respect to said support means;

second electrooptical means associated with said wind vane means for providing a signal indicative of said windflow direction;

a plurality of third electrooptical means, each of said third electrooptical means being associated with one of said airfoil shafts for providing a signal indicative of the orientation of its associated airfoil surface with respect to said framework; and computer means for receiving signals from said first electrooptical means, said second electrooptical means and each of said third electrooptical means and for determining the location of said leeward sector and said windward sector and for controlling said latching and unlatching means.

31. A wind powered generator comprising:

support means;

a framework rotatable with respect to said support means about a central axis;

a plurality of airfoil shafts, each of said airfoil shafts being adapted to revolve about said central axis through a leeward sector wherein said airfoil shaft moves in generally the same direction as a windflow direction and through a windward sector wherein said airfoil shaft moves in a direction generally opposite of said windflow direction;

an airfoil associated with each airfoil shaft and having a surface symmetrically disposed about its associated airfoil shaft, each of said airfoils being rotatable about its associated airfoil shaft and being adapted to revolve with its associated airfoil shaft about said central axis, each of said airfoil surfaces being configured to rotate into a position generally parallel to said windflow direction when permitted to rotate freely about its associated airfoil shaft, each of said airfoils comprising:

a plurality of elongated arms disposed parallel to said airfoil shaft;

an upper frame interconnecting upper ends of each of said arms;

a lower frame interconnecting lower ends of each of said arms; and a flexible material tightly stretched between each of said arms and said airfoil shaft;

a cross-sectional configuration of each of said airfoils being variable by altering the shape of said upper frame and said lower frame for adaptation to specific wind conditions; and means for selectively latching each of said airfoils in said leeward sector in a fixed torque-producing position wherein said airfoil surface is nonparallel to said windflow direction to generate wind-produced torque about said central axis and for selectively unlatching each of said airfoils in said windward sector to permit the unlatched airfoil to rotate freely into a position generally parallel to said windflow direction.

* * * * *